United States Patent
Pawley

(10) Patent No.: US 8,720,659 B2
(45) Date of Patent: May 13, 2014

(54) OVERRUNNING COUPLING AND CONTROL ASSEMBLY INCLUDING AN ELECTROMECHANICAL ACTUATOR SUBASSEMBLY

(75) Inventor: Brice A. Pawley, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 288 days.

(21) Appl. No.: 13/050,377

(22) Filed: Mar. 17, 2011

(65) Prior Publication Data
US 2011/0233026 A1 Sep. 29, 2011

Related U.S. Application Data

(60) Provisional application No. 61/317,787, filed on Mar. 26, 2010.

(51) Int. Cl.
*F16D 41/12* (2006.01)

(52) U.S. Cl.
USPC ......... 192/46; 192/84.92; 192/84.95; 192/90; 192/84.93

(58) Field of Classification Search
USPC .............................. 192/69.42, 69.1
See application file for complete search history.

(56) References Cited

U.S. PATENT DOCUMENTS

| | | | |
|---|---|---|---|
| 1,960,004 A * | 5/1934 | Franz | 192/47 |
| 2,093,315 A * | 9/1937 | Finnegan | 192/46 |
| 3,082,933 A | 3/1963 | Bernard | |
| 3,205,989 A | 9/1965 | Mantey | |
| 4,050,560 A | 9/1977 | Torstenfelt | |
| 5,362,293 A | 11/1994 | Romanauskas | |
| 5,638,929 A | 6/1997 | Park | |
| 5,678,668 A | 10/1997 | Sink | |
| 5,918,715 A | 7/1999 | Ruth et al. | |
| 5,924,510 A | 7/1999 | Itoh et al. | |
| 5,927,455 A | 7/1999 | Baker et al. | |
| 6,193,038 B1 | 2/2001 | Scott et al. | |
| 6,244,965 B1 | 6/2001 | Klecker et al. | |
| 6,290,044 B1 | 9/2001 | Burgman et al. | |
| 6,503,167 B1 | 1/2003 | Sturm | |
| 6,814,201 B2 | 11/2004 | Thomas | |
| 6,953,409 B2 | 10/2005 | Schmidt et al. | |
| 7,093,512 B2 | 8/2006 | Ibamoto et al. | |
| 7,198,587 B2 | 4/2007 | Samie et al. | |
| 7,223,198 B2 | 5/2007 | Kimes et al. | |
| 7,256,510 B2 | 8/2007 | Holmes et al. | |
| 7,258,214 B2 | 8/2007 | Pawley et al. | |
| 7,275,628 B2 | 10/2007 | Pawley et al. | |

(Continued)

OTHER PUBLICATIONS

International Search Report and Written Opinion; International Appln No. PCT/US2011/028981; mailed May 11, 2011.

(Continued)

*Primary Examiner* — David D Le
*Assistant Examiner* — Mark Manley
(74) *Attorney, Agent, or Firm* — Brooks Kushman P.C.

(57) ABSTRACT

An overrunning coupling or clutch and control assembly including first and second coupling members and an electromechanical actuator subassembly having an electromagnetically inductive coil which creates a magnetic flux when the coil is energized is provided. A control force caused by the magnetic flux is applied to an armature member of the subassembly to move the armature member and cause the coupling members to be either coupled to or uncoupled from each other by means of struts.

30 Claims, 6 Drawing Sheets

(56) References Cited

U.S. PATENT DOCUMENTS

Figure 1:
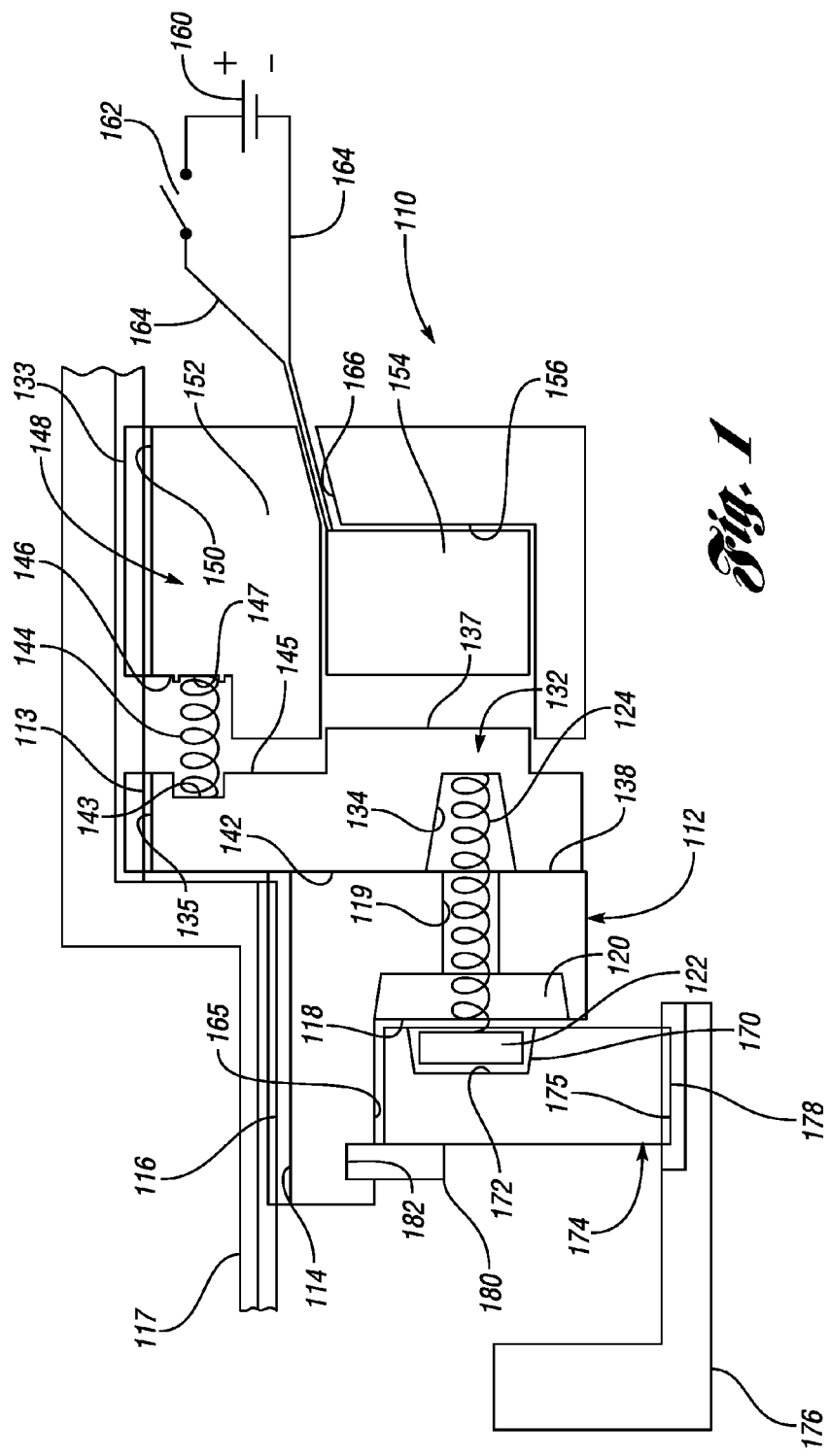

| | | |
|---|---|---|
| 7,344,010 B2 | 3/2008 | Fetting, Jr. et al. |
| 7,349,010 B2 | 3/2008 | Bryant et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 2004/0110594 A1 | 6/2004 | Goto |
| 2006/0185957 A1 | 8/2006 | Kimes et al. |
| 2007/0056825 A1 | 3/2007 | Fetting, Jr. et al. |
| 2007/0278061 A1 | 12/2007 | Wittkopp et al. |
| 2008/0110715 A1 | 5/2008 | Pawley |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0098970 A1 | 4/2009 | Kimes |
| 2009/0159391 A1 | 6/2009 | Eisengruber |
| 2009/0211863 A1 | 8/2009 | Kimes |
| 2010/0200358 A1 | 8/2010 | Eisengruber et al. |
| 2010/0230226 A1 | 9/2010 | Prout |
| 2010/0252384 A1 | 10/2010 | Eisengruber |

OTHER PUBLICATIONS

International Report on Patentability; International Application No. PCT/US2011/028981; date of issuance of report Oct. 2, 2012.

* cited by examiner

OVERRUNNING COUPLING AND CONTROL ASSEMBLY INCLUDING AN ELECTROMECHANICAL ACTUATOR SUBASSEMBLY

CROSS-REFERENCE TO RELATED APPLICATIONS

This application claims the benefit of U.S. provisional patent application entitled "ELECTROMAGNETIC ONE-WAY CLUTCH (OWC) OR COUPLING ASSEMBLY" filed on Mar. 26, 2010, and having U.S. Ser. No. 61/317,787.

TECHNICAL FIELD OF THE INVENTION

This invention generally relates to controllable or selectable overrunning clutches or coupling assemblies and, in particular, to overrunning coupling and control assemblies including electromechanical actuator subassemblies for use in vehicular automatic transmissions.

Overview

A typical one-way clutch (i.e., OWC) consists of a first member, a second member, and one or more locking devices between opposing surfaces of the two members. The one-way clutch is designed to lock in one direction and to allow free rotation in the opposite direction. Two types of one-way clutches often used in vehicular, automatic transmissions include:

roller type which includes spring-loaded rollers between inner and outer races of the one-way clutch. (Roller type is also used without springs on some applications); and sprag type which includes asymmetrically shaped wedges located between inner and outer races of the one-way clutch.

The one way clutches are typically used in the transmission to prevent an interruption of drive torque (i.e., power flow) during certain gear shifts and to allow engine braking during coasting.

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. No. 7,258,214 discloses an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. patent publications include: 2010/0252384; 2010/0230226; 2010/0200358; 2009/0211863; 2009/0159391; 2009/0098970; 2008/0223681; 2008/0110715; 2008/0169166; 2008/0185253; 2007/0278061; 2007/0056825; 2006/0185957; and the following U.S. Pat. Nos. 7,491,151; 7,464,801; 7,349,010; 7,275,628; 7,256,510; 7,223,198; 7,198,587; 7,093,512; 6,953,409; 6,814,201; 6,503,167; 6,193,038; 4,050,560; 5,638,929; 5,362,293; 5,678,668; and 5,918,715.

Vehicular air conditioner compressor clutches are disclosed in U.S. Pat. Nos. 3,082,933 and 3,205,989.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

Despite the above prior art, there is still a need to simplify control or manipulation of controllable one-way clutches or coupling assemblies.

Objects, features and technical advantages of at least one embodiment of the present invention are readily apparent to one skilled in the art from the following detailed description and claims when taken in connection with the accompanying drawings and in view of the prior art.

SUMMARY OF EXAMPLE EMBODIMENTS

An overrunning coupling and control assembly is provided. The assembly includes first and second coupling members supported for rotation relative to one another about a common rotational axis. The first coupling member has a coupling first face oriented to face axially in a first direction along the rotational axis. The second coupling member has a coupling second face opposed to the first face and oriented to face axially in a second direction along the rotational axis. The second coupling member has a third face spaced from the second face and oriented to face axially in the first direction. The second face has a set of pockets spaced about the rotational axis. Each pocket of the set has a strut received thereby. The first face has a set of locking formations that are engaged by the struts upon projecting outwardly from the set of pockets to prevent relative rotation of the first and second coupling members with respect to each other in at least one direction about the axis. The third face has a set of passages spaced about the rotational axis and in communication with their respective pockets. The assembly also includes a support member and an electromechanical actuator subassembly. The subassembly includes an electromagnetically inductive coil to create a magnetic flux when the coil is energized. One of the support member and the second coupling member is an armature member of the subassembly. The armature member is mounted for controlled shifting movement along the rotational axis relative to the first coupling member between a first position which corresponds to a first mode of the assembly and a second position which corresponds to a second mode of the assembly. The subassembly also includes a set of actuators supported by the support member. Each passage of the set of passages has an actuator received thereby to actuate its respective strut within its respective pocket so that its respective strut moves into contact with the locking formations to couple the first and second coupling members for rotation with each other in at least one direction about the rotational axis in one of the positions of the armature member. The subassembly further includes at least one biasing member exerting a biasing force on the armature member along the rotational axis. A control force is applied to the armature member when the coil is energized to cause the armature member to move from its first position to its second position along the rotational axis against the biasing force of the at least one biasing member. In the absence of the control force the at least one biasing member moves the armature member from the second position back to the first position along the rotational axis.

Each of the struts may have an end that is pivotally movable outwardly of its respective pocket.

The assembly may further include a set of biasing members that bias their respective struts against pivotal movement of their respective ends out of their respective pockets toward the locking formations. The set of actuators may pivot the ends of their respective struts against the bias of the set of biasing members and into contact with the locking formations to couple the first and second coupling members for rotation with each other in the at least one direction about the rotational axis. The set of biasing members may be configured to move the ends of each respective strut back into their respective pockets to permit relative rotation of the coupling members in the at least one direction about the rotational axis.

The support member may be the armature member and the at least one biasing member may be disposed between the second coupling member and the support member to urge the support member towards its first position.

The first position may be an overrun position, the first mode may be an overrun mode, the second position may be a locked position and the second mode may be a locked mode.

The first position may be a locked position, the first mode may be a locked mode, the second position may be an overrun position and the second mode may be an overrun mode.

The struts may include at least one forward strut.

The set of actuators may include spring actuators.

The first, second and third faces may be generally annular and extend generally radially with respect to the rotational axis.

The subassembly may include a stationary housing having a cavity in which the coil is housed. The housing may have an opening at which the armature member moves along the rotational axis when the control force is applied.

The armature member may move into the cavity at the opening or may move transverse the opening.

The support member may be the armature member and the subassembly may further include a bearing for rotatably supporting the support member.

The second coupling member may be the armature member and the at least one biasing member may be disposed between the second coupling member and the support member to urge the second coupling member towards its first position.

In one embodiment, an overrunning clutch and control assembly is provided. The assembly includes first and second clutch members supported for rotation relative to one another about a common rotational axis. The first clutch member has a coupling first face oriented to face axially in a first direction along the rotational axis and the second clutch member has a coupling second face opposed to the first face and oriented to face axially in a second direction along the rotational axis. The second clutch member has a third face spaced from the second face and oriented to face axially in the first direction. The second face has a set of pockets spaced about the rotational axis. Each pocket of the set has a strut received thereby. The first face has a set of locking formations that are engaged by the struts upon projecting outwardly from the set of pockets to prevent relative rotation of the first and second clutch members with respect to each other in at least one direction about the axis. The third face has a set of passages spaced about the rotational axis and in communication with their respective pockets. The assembly also includes a support member and an electromechanical actuator subassembly. The subassembly includes an electromagnetically inductive coil to create a magnetic flux when the coil is energized. One of the support member and the second clutch member is an armature member of the subassembly. The armature member is mounted for controlled shifting movement along the rotational axis relative to the first clutch member between a first position which corresponds to a first mode of the assembly and a second position which corresponds to a second mode of the assembly. The subassembly also includes a set of actuators supported by the support member. Each passage of the set of passages has an actuator received thereby to actuate its respective strut within its respective pocket so that its respective strut moves into contact with the locking formations to couple the first and second clutch members for rotation with each other in at least one direction about the rotational axis in one of the positions of the armature member. The subassembly further includes at least one biasing member exerting a biasing force on the armature member along the rotational axis. A control force is applied to the armature member when the coil is energized to cause the armature member to move from its first position to its second position along the rotational axis against the biasing force of the at least one biasing member. In the absence of the control force the at least one biasing member moves the armature member from the second position back to the first position along the rotational axis.

DETAILED DESCRIPTION OF THE DRAWINGS AND EXAMPLE EMBODIMENTS

FIG. 1 is a side schematic view, partially broken away and in cross section (but not showing any crosshatching), of the upper half (for purposes of simplicity because of symmetry) of one embodiment of a controllable one-way clutch or coupling assembly, generally indicated at 110, constructed in accordance with the present invention. The assembly 110 includes a stationary annular pocket plate, generally at 112. An outer axially-extending surface 114 of the plate 112 has external splines 116, by which the plate 112 is splined at the splined, inner surface of a stationary transmission case 117.

An inner radially extending surface 118 of the plate 112 is formed with spaced pockets 120 (only one of which is shown) in which struts 122 (only one of which is shown) are normally received and retained. One end portion of each strut 122 may be biased outwardly by a coil spring (not shown) disposed within an aperture of the pocket 120 so that each strut 122 is normally maintained in its pocket 120. The opposite end portion of each strut 122 is controllably biased by one end of a spring 124 when an annular, biasing armature plate, generally indicated at 132, on which the springs 124 are supported move (to the left in FIG. 1) towards the opposite end portion of the strut 122. Each spring 124 moves in its respective hole 119 which extends through the pocket plate 112 to overcome the bias of the coil springs on their respective struts 122.

The annular biasing plate 132 has splines 113 formed on an external axially extending surface 135 of the plate 132 by which the plate 132 is splined to the stationary case 117 to prevent rotary movement but allow axial movement of the plate 132. The plate 132 also has a plurality of spaced circular apertures 134 in which one end of the springs 124 are received and retained. The springs 124 extend through an outer radially extending surface 138 of the plate 112 and into the holes 119 of the plate 112. Alternatively, a plurality of spring supports may be formed on an inner surface 142 of the plate 132 to support the ends of the springs 124. The biasing plate 132 also supports a plurality of biasing coil springs 144 within apertures 143. The springs 144 extend between the apertures 143 in the outer surface 145 of the plate 132 and spring supports 147 formed on an inner surface 146 of a coil housing, generally indicated at 148, to bias the plate 132 and the housing 148 apart. An exterior surface 150 of a portion 152 of the housing 148 is also splined to the inner surface of the case 117 by splines 133 so that the housing 148 and an armature or electromagnetic coil 154 disposed within a cavity 156 formed within the housing 148 is stationary.

The coil 154 has many turns and is preferably embedded within and surrounded by a suitable resin. The coil housing 148 is made of a paramagnetic material such as steel or malleable iron. The coil 154 attracts a portion of the biasing armature plate 132 to the housing 148 against the biasing action of the springs 144 when the coil 154 is energized by a DC voltage source 160 under control of a controller in the form of a switch 162. Wiring 164 to the coil 154 extends from the source 160 and the switch 162 through a passage 166 formed through the housing 148.

When the struts 122 pivot in their pockets 120 (by the biasing action of the springs 124), the struts 122 engage spaced locking formations or notches 170 formed in a radially extending surface 172 of a rotatable notch plate, generally indicated at 174. The struts 122 engage the locking formations 170 during movement of the plate 132 towards the plate 112. The notch plate 174 is coupled to a splined, rotatable hub 176 by internal splines 178 formed on an axially extending surface 175 of the notch plate 174 to rotate relative to and within the plate 112 about an axis of rotation.

A snap ring 180 is disposed within a groove 182 formed in an inner axially extending surface 165 of the plate 112 to retain the notch plate 174 to the plate 112. The ring 180 holds the plates 174 and 112 together and prevents axial movement of the plate 174 (to the left in FIG. 1).

The struts 122 lock the notch plate 174 to the pocket plate 112 in one direction of relative rotational movement about an axis of rotation but allow free-wheeling in the opposite direction about the axis of rotation. As in the other embodiments of the present invention, other operating configurations are also possible wherein clutch locking can occur in both directions and/or free-wheeling can occur in both directions depending on the energized state of the coil 154.

The struts 122 lock the notch plate 174 when the coil 154 is not energized under the biasing action of the springs 124. The struts 122 unlock the notch plate 174 when the annular plate 132 and its supported springs 124 move towards the coil housing 148 when the armature coil 154 is energized. The energized coil 154 generates a magnetic flux or field which may be considered as flowing through the coil housing 148, through a portion 137 of the plate 132, and across the small air gaps between the coil housing 148 and the armature plate 132. The magnetic flux density is created to provide an attractive force between the housing 148 and the plate 132 to pull the portion 137 of the plate 132 into the cavity 156.

Figure 2:
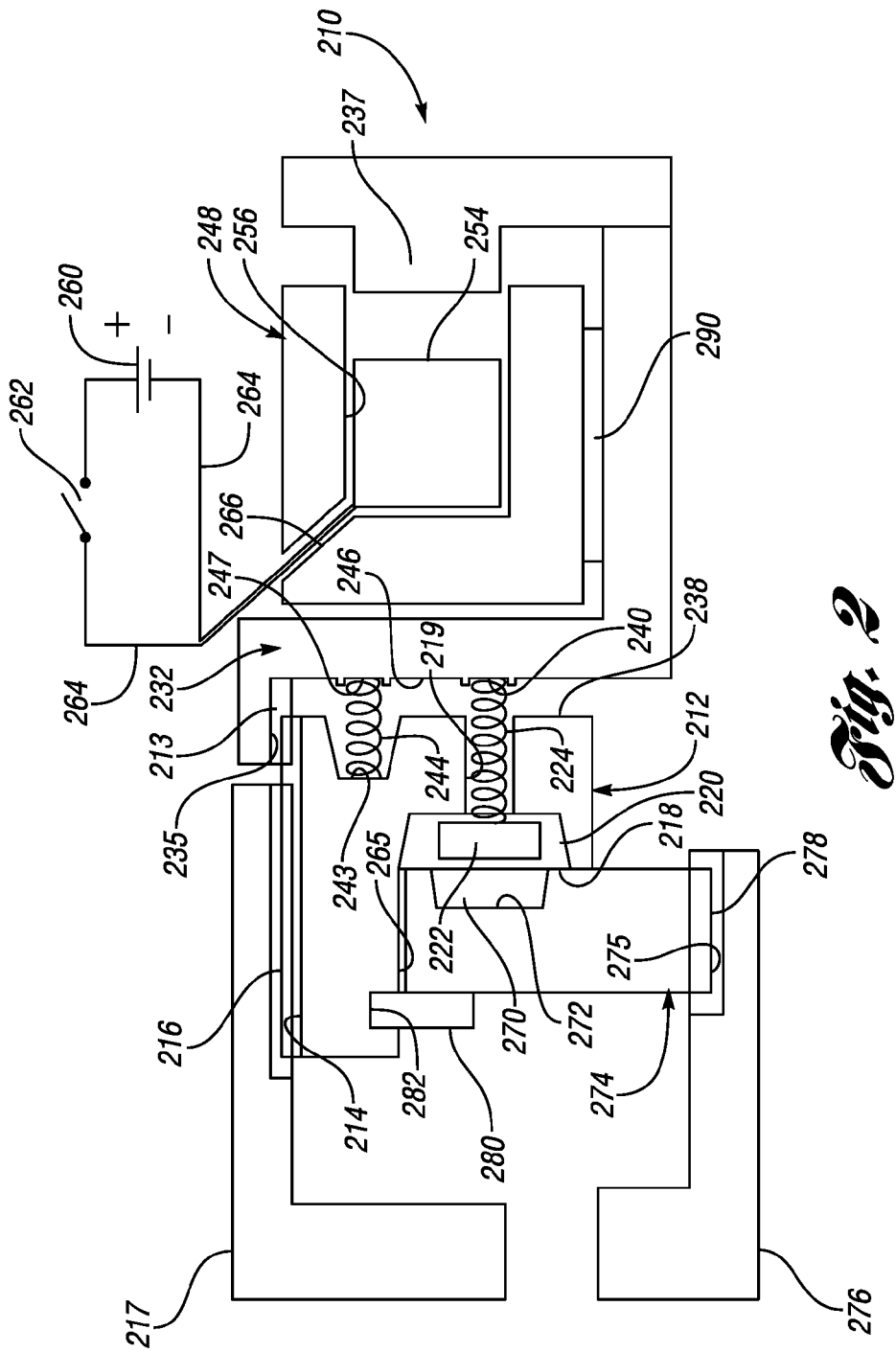

FIG. 2 is a is a side schematic view, partially broken away and in cross section (but not showing any crosshatching), of the upper half (for purposes of simplicity because of symmetry) of a second embodiment of a controllable one-way clutch or coupling assembly, generally indicated at 210, constructed in accordance with the present invention. The assembly 210 has many of the same parts and their attendant functions as the assembly 110. Consequently, the reference numbers of the parts of the assemblies 110 and 210 are the same except for the "100" or "200" designations, respectively. This numbering scheme is substantially followed for the other four embodiments of FIGS. 3 through 6, respectively.

The assembly 210 includes an annular pocket plate, generally indicated at 212. An outer axially-extending surface 214 of the plate 212 has external splines 216 by which the plate 212 is splined to a rotatable hub 217 to rotate therewith. An inner radially extending surface 218 of the plate 212 is formed with spaced pockets 220 (only one of which is shown), in which struts 222 (only one of which is shown) are normally received and retained. One end portion of each strut 222 may be biased outwardly by a coil spring (not shown) disposed within an aperture of the pocket 220 so that each strut 222 is normally maintained in its pocket 220. The opposite end portion of each strut 222 is controllably biased by one end of a spring 224 when a U-shaped biasing, armature plate or member, generally indicated at 232, on which the springs 224 are supported (by supports 240) moves towards the opposite end portion of the strut 222. Each spring 224 moves in a hole 219 which extends through the pocket plate 212 to overcome the bias of the previously mentioned coil springs on their separate struts 222.

The annular biasing plate 232 has splines 213 formed on an internal axially extending surface 235 of the plate 232 by which the plate 232 is splined to the plate 212 to rotate therewith. A bearing 290 rotatably supports the plate 232 so the plate 232 rotates relative to a stationary housing, generally indicated at 248. The plurality of spring supports 240 are formed on an inner surface 246 of the plate 232 to support the springs 224 which extend into the holes 219. The biasing plate 232 also supports (at supports 247) a plurality of biasing coil springs 244 which extend between the outer surface 246 of the plate 232 and apertures 243 formed in a surface 238 of the plate 212. The springs 244 bias the plates 212 and 232 apart.

An electromagnetic coil 254 is disposed within a cavity 256 formed in the coil housing 248 so that the coil 254 is stationary. The coil 254 has many turns and is preferably embedded within and surrounded by a suitable resin. The coil housing 248 is made of a paramagnetic material such as steel or malleable iron. The coil 254 attracts a portion of the biasing armature plate 232 into the housing 248 against the biasing action of the springs 244 when the coil 254 is energized by a DC voltage source 260 under control of a controller in the form of a switch 262. Wiring 264 to the coil 254 extends from the source 260 and the switch 262 through a passage 266 formed through the housing 248.

The struts 222 pivot in their pockets 220 (by the biasing action of the springs 224) to engage spaced locking formations or notches 270 formed in a radially extending surface 272 of a rotatable notch plate, generally indicated at 274. The struts 222 engage the locking formations 270 during movement of the plate 232 towards the plate 212. The notch plate 274 is coupled to a splined, rotatable hub 276 by internal splines 278 formed on inner axially extending surface 275 of notch plate 274 to rotate relative to and within the plate 212 about an axis of rotation. The hubs 217 and 276 may or may not rotate at the same RPM.

A snap ring 280 is disposed within a groove 282 formed in an inner axially extending surface 265 of the plate 212 to retain the notch plate 274 to the plate 212. The ring 280 holds the plates 274 and 212 together and prevents axial movement of the plate 274 (to the left is FIG. 2).

The struts 222 lock the notch plate 274 to the pocket plate 212 in one direction of relative rotational movement about an axis of rotation but allow free-wheeling in the opposite direction about the axis of rotation. As noted earlier, other operating configurations are also possible. The struts 222 unlock the notch plate 274 when the coil is "off". The struts 222 lock the notch plate 274 when the coil 254 is "on". The struts 222 lock the notch plate 274 when the plate 232 and the supported springs 244 move away from the coil housing 248 during energizing of the armature coil 254. The energized coil 254 generates a magnetic flux or field which may be considered as flowing through the coil housing 248, through a portion 237 of the plate 232 and across small air gaps between the coil housing 248 and the portion 237 of the armature plate 232. The magnetic flux density is created to provide an attractive force between the housing 248 and the plate 232 to pull the portion 237 of the plate 232 into the cavity 256.

Figure 3:
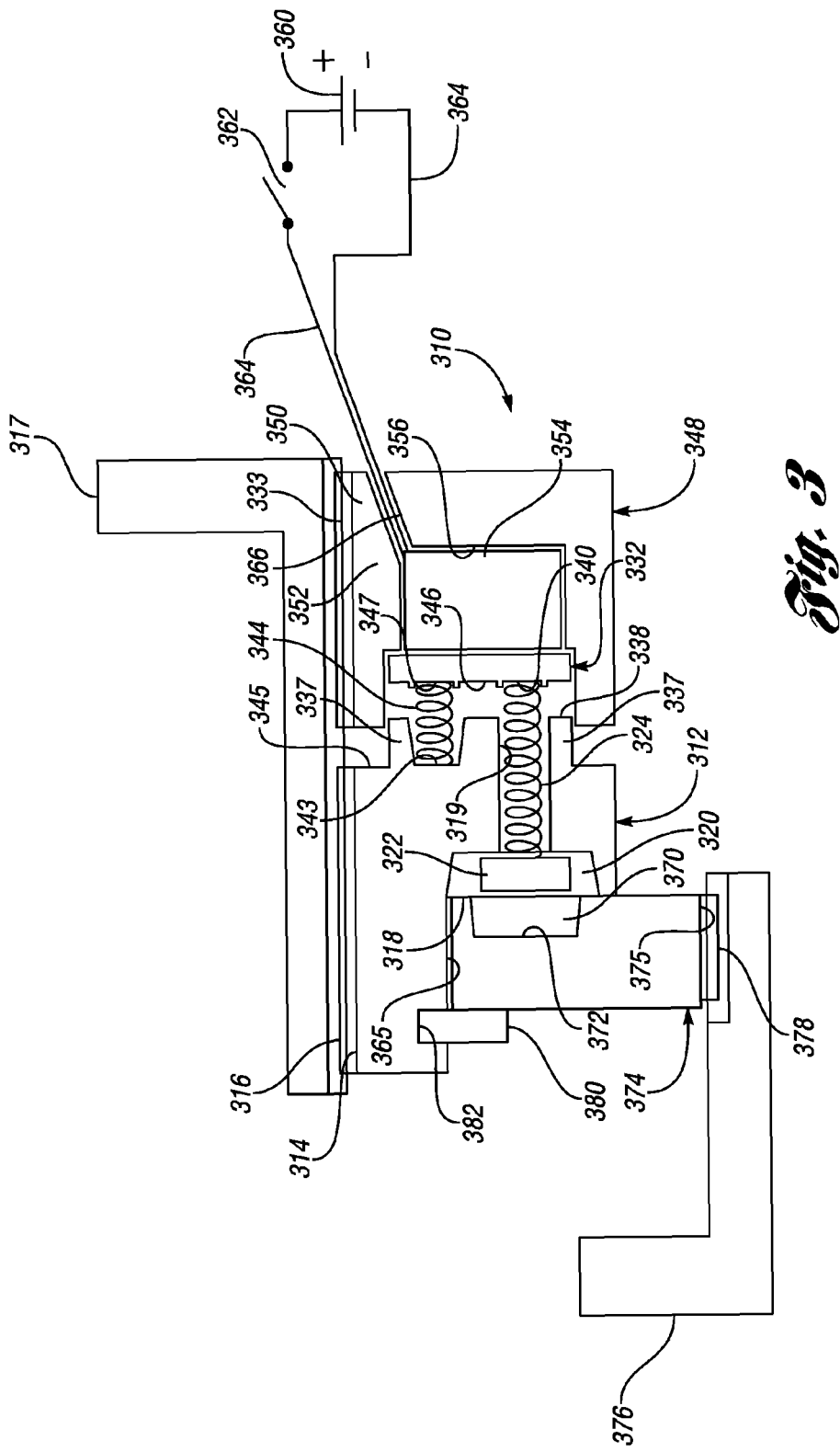

FIG. 3 is a side schematic view, partially broken away and in cross section (but not showing any crosshatching), of the upper half (for purposes of simplicity because of symmetry) of a third embodiment of a controllable one-way clutch or coupling assembly, generally indicated at 310, constructed in accordance with the present invention. The assembly 310 includes an annular pocket plate, generally indicated at 312.

An outer axially-extending surface 314 of the plate 312 has external splines 316 by which the plate 312 is splined to the inner surface of a stationary transmission case 317.

An inner radially extending surface 318 of the plate 312 is formed with spaced pockets 320 (only one of which is shown), in which struts 322 (only one of which is shown) are received and retained. One end portion of each strut 322 may be biased outwardly by a coil spring (not shown) disposed within an aperture of the pocket 320 so that the strut 322 is maintained in its pocket 320. The opposite end portion of each strut 322 is controllably biased and rotated by a spring 324 when an annular non-paramagnetic (such as aluminum) biasing plate or member, generally indicated as 332, on which the springs 324 are supported (by supports 340) move towards the opposite end portion of the strut 322 within holes 319 extending through the pocket plate 312 to overcome the bias of their respective coil springs.

The springs 324 extend through an outer radially extending surface 338 of the plate 312 and into the holes 319. The plurality of spring supports 340 are formed on an inner surface 346 of the plate 332 to support the springs 324. The biasing plate 332 also supports a plurality of biasing coil springs 344 (by supports 347) which extend between the outer surface 346 of the plate 332 and apertures 343 formed in the surface 338 of the plate 312.

A coil housing member, generally indicated at 348, has splines 333 formed on an outer, axially extending surface 350 of a portion 352 of the member 348 by which the stationary housing 348 is splined to the stationary case 317. An electromagnetic coil 354 is disposed within a cavity 356 within the housing member 348 and, consequently, is also stationary. The coil 354 has many turns and is preferably embedded within and surrounded by a suitable resin. The coil housing 348 is of a paramagnetic material such as steel or malleable iron. When the coil 354 is energized the coil 354 attracts portions 337 of the plate 312 which extend from the surface 345 to the housing 348 against the biasing action of the springs 344. The coil 354 is energized by a DC voltage source 360 controlled by a controller in the form of a switch 362. Wiring 364 to the coil 354 extends from the source 360 and the switch 362 through a passage 366 formed through the housing 348.

The struts 322 pivot in their pockets 320 (by the biasing action of the springs 324) to engage spaced locking formations or notches 370 formed in a radially extending surface 372 of a rotatable notch plate, generally indicated at 374. The struts 322 engage the locking formations 370 during movement of the plate 332 and the supported springs 324 towards the plate 312. The notch plate 374 is coupled to a splined rotatable hub 376 by internal splines 378 formed on inner axially extending surface 375 of the notch plate 374 to rotate relative to and within the plate 312 about an axis of rotation.

A snap ring 380 is disposed within a groove 382 formed in an inner axially extending surface 365 of the plate 312 to retain the notch plate 374 and the plate 312 together. The ring 380 holds the plates 374 and 312 together to prevent axial movement of the plate 374 (to the left is FIG. 3).

The struts 322 lock the notch plate 374 to the pocket plate 312 in one direction of relative rotational movement about an axis of rotation but allow free-wheeling in the opposite direction about the axis of rotation. As noted earlier, other operating configurations are also possible. The struts 322 lock the notch plate 374 when the coil 354 is "on". The struts 322 unlock the notch plate 374 when the plate 312 moves away from the housing 348 after energizing of the armature coil 354 was stopped. The energized coil 354 generates a magnetic flux or field which may be considered as flowing through the coil housing 348, through the portions 337 of the plate 312 and across the small air gaps between the coil housing 348 and the portions 337 of the plate 312. The magnetic flux density is created to provide an attractive force between the housing 348 and the plate 312.

Figure 4:
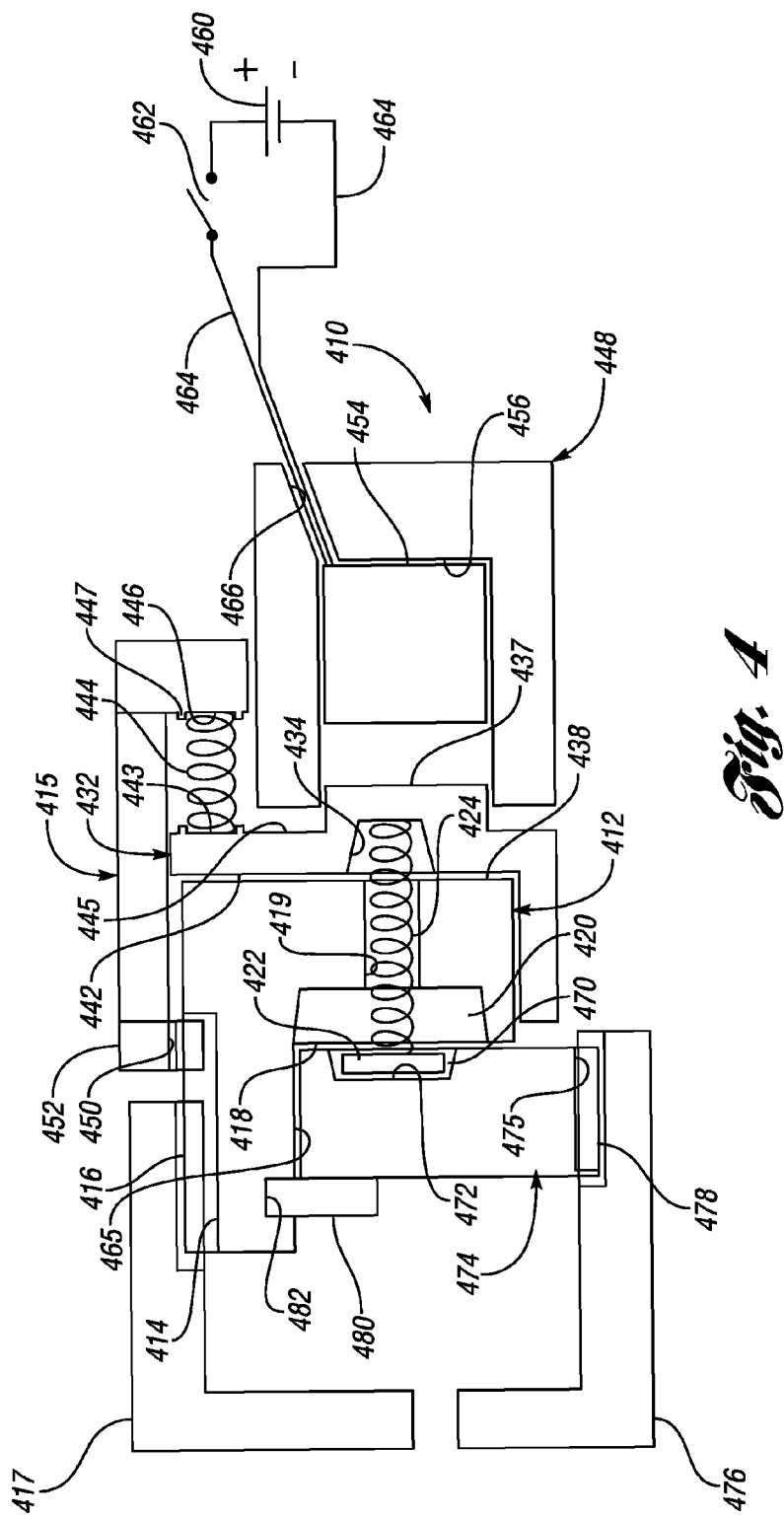

FIG. 4 is a side schematic view, partially broken away and in cross section (but not showing any crosshatching), of the upper half (for purposes of simplicity because of symmetry) of a fourth embodiment of a controllable one-way clutch or coupling assembly, generally indicated at 410, constructed in accordance with the present invention. The assembly 410 includes an annular pocket plate, generally indicated at 412. An outer axially-extending surface 414 of the plate 412 has external splines 416 to couple the plate 412 to a rotatable hub 417 and a rotatable outer housing member, generally indicated at 415.

An inner radially extending surface 418 of the plate 412 is formed with spaced pockets 420 (only one of which is shown), in which struts 422 (only one of which is shown) are normally received and retained. One end portion of each strut 422 may be biased outwardly by a coil spring (not shown) disposed within an aperture of the pocket 420 so that the strut 422 is normally maintained in its pocket 420. The opposite end portion of each strut 422 is controllably biased by a spring 424 when an L-shaped biasing, armature plate or member, generally indicated at 432, on which the springs 424 are supported move towards the opposite end portion of the strut 422. The springs 424 move within holes 419 which extend through the pocket plate 412 to overcome the bias of the coil springs.

The springs 424 extend through an outer radially extending surface 438 of the plate 412, into the holes 419 and into the pocket 420. A plurality of spring supports may be formed on an inner surface 442 of the plate 432 to support the springs 424. However, in the embodiment the springs 424 are supported within apertures 434 formed in the plate 432. The biasing plate 432 also supports a plurality of biasing coil springs 444 (by supports 443) which extend between the outer surface 445 of the plate 432 and supports 447 formed on a surface 446 of the member 415. A surface 450 of a portion 452 of the housing member 415 is splined to the outer surface 414 of the plate 412 so that the member 415, the pocket plate 412 and the hub 417 rotate together.

A coil 454 having many turns is preferably embedded within and surrounded by a suitable resin within a cavity 456 of a stationary coil housing, generally indicated as 448. The coil housing 448 is of a paramagnetic material such as steel or malleable iron. The coil 454 attracts a portion 437 of the biasing armature plate 432 to the housing 448 against the biasing action of the springs 444 when the coil 454 is energized by a DC voltage source 460 controlled by a controller in the form of a switch 462. Wiring 464 to the coil 454 extends from the voltage source 460 and the switch 462 through a passage 466 formed through the housing 448.

The struts 422 pivot in their pockets 420 (by the biasing action of the springs 424) to engage spaced locking formations or notches 470 formed in a radially extending surface 472 of a rotatable notch plate, generally indicated at 474. The struts 422 engage the locking formations 470 during movement of the plate 432 towards the plate 412. The notch plate 474 is coupled to a splined rotatable hub 476 by internal splines 478 formed on inner axially extending surface 475 of the notch plate 474 to rotate relative to and within the plate 412 about an axis of rotation. The hubs 417 and 476 may or may not rotate as the same angular speed.

A snap ring 480 is disposed within a groove 482 formed in an inner axially extending surface 465 of the plate 412 to retain the notch plate 474 to the plate 412. The ring 480 holds the plates 474 and 412 together to prevent axial movement of the plate 474 (to the left is FIG. 4).

The struts 422 lock the notch plate 474 to the pocket plate 412 in one direction of relative rotational movement about an axis of rotation but allow free-wheeling in the opposite direction about the axis of rotation. As noted earlier, other operating configurations are also possible. The struts 422 lock the notch plate 474 when the coil 454 is "off" due to the biasing action of the springs 444. The struts 422 unlock the notch plate 474 when the plate 432 and its supported springs 424 move towards the coil housing 448 during energizing of the armature coil 454. The energized coil 454 generates a magnetic flux or field which may be considered as flowing through the coil housing 448, through the portion 437 of the plate 412 and across the small air gaps between the coil housing 448 and the portion 437 of the armature plate 432. The magnetic flux density is increased to provide an attractive force between the housing 448 and the plate 432.

Figure 5:
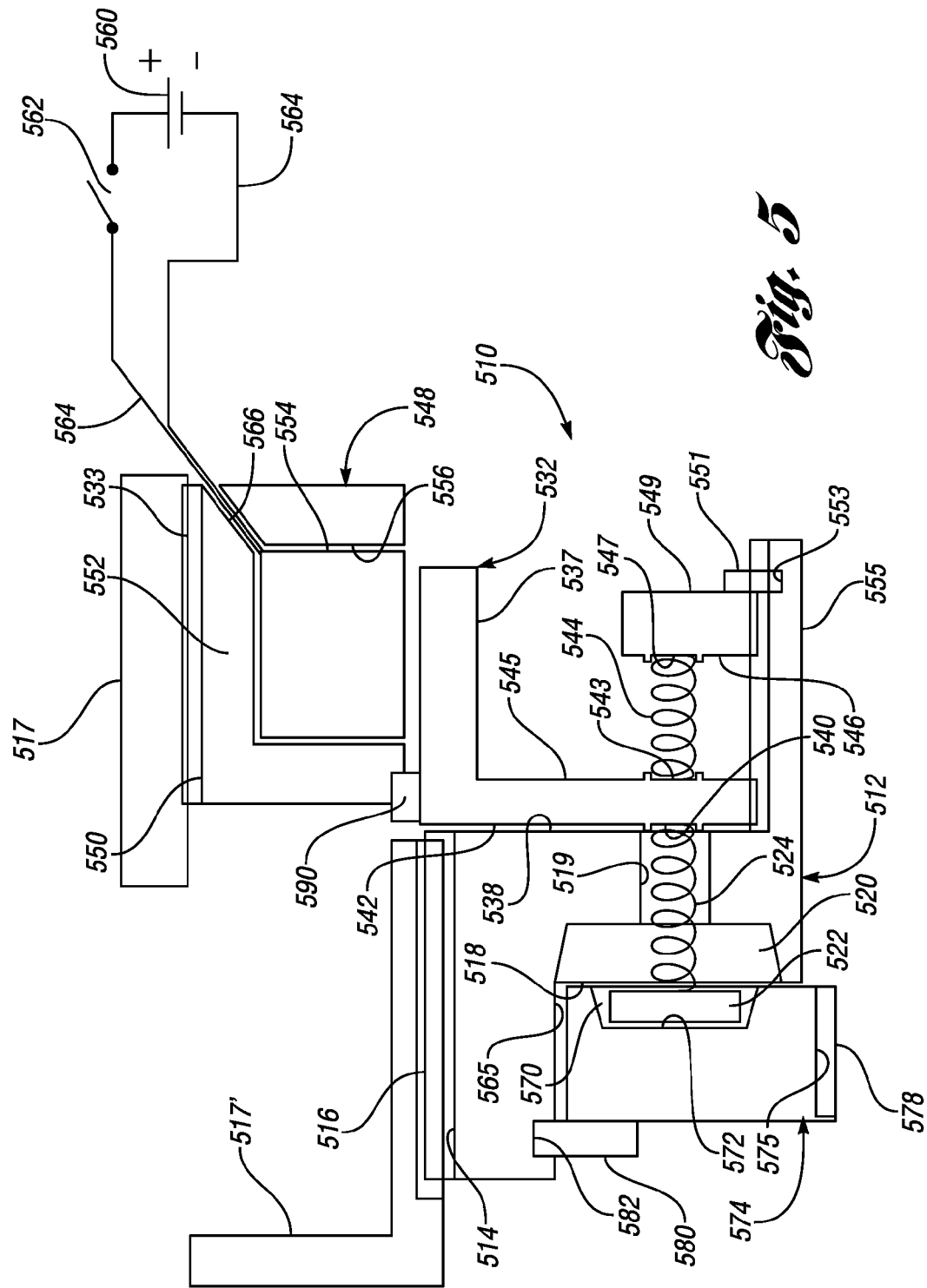

FIG. 5 is a side schematic view, partially broken away and in cross section (but not showing any crosshatching), of the upper half (for purposes of simplicity because of symmetry) of a fifth embodiment of a controllable one-way clutch or coupling assembly, generally indicated at 510, constructed in accordance with the present invention. The assembly 510 includes an annular pocket plate, generally indicated at 512. An outer axially-extending surface 514 of the plate 512 has external splines 516 to couple the plate 512 to either a transmission case or rotatable hub 517'. Consequently, the pocket plate 512 can either be stationary or rotatable, respectively, in this embodiment.

An inner radially extending surface 518 of the plate 512 is formed with spaced pockets 520 (only one of which is shown), in which struts 522 (only one of which is shown) are normally received and retained. One end portion of each strut 522 may be biased outwardly by a coil spring (not shown) disposed within an aperture of the pocket 520 so that the strut 522 is maintained in its pocket 520. The opposite end portion of each strut 522 is controllably biased by a spring 524 when an L-shaped biasing, armature plate or member, generally indicated at 532, on which the springs 524 are supported (at supports 540) move towards the opposite end portion of the strut 522 within holes 519 formed through the pocket plate 512 to overcome the bias of the coil springs.

A coil housing member, generally indicated at 548, has splines formed on an internal axially extending surface 550 of a portion 552 of the member 548 by which the housing 548 is splined to the transmission case 517. An electromagnetic coil 554 disposed within a cavity 556 within the housing 548 is stationary.

The springs 524 extend through an outer radially extending surface 538 of the plate 512 into the holes 519 and into the pockets 520. A plurality of the spring supports 540 are formed on an inner surface 542 of the plate 532 to support ends of the springs 524. The biasing plate 532 also supports a plurality of biasing coil springs 544 (at supports 543) which extend between an outer surface 545 of the plate 532 and an inner surface 546 of a coil spring support member 549 at spring supports 547. A snap ring 551 is disposed within a groove 553 formed in an axially extending portion 555 of the plate 512. The plate 532 and the member 549 are splined to the portion 555 of the plate 512 to rotate therewith relative to the housing 548 by means of a bearing 590 which rotatably supports the plate 532 if the plate 512 is rotatable.

The coil 554 has many turns and is preferably embedded within and surrounded by a suitable resin. The coil housing 548 is of a paramagnetic material such as steel or malleable iron. The coil 554 attracts the biasing armature plate 532 to move to the right in FIG. 5 against the biasing action of the springs 544 when energized by a DC voltage source 560 controlled by a controller in the form of a switch 562. Wiring 564 to the coil 554 extends from the source 560 and the switch 562 through a passage 566 formed through the housing 548.

The struts 522 pivot in their pockets 520 (by the biasing action of the springs 524) to engage spaced locking formations or notches 570 formed in a radially extending surface 572 of a rotatable notch plate, generally indicated at 574. The struts 522 engage the locking formations 570 during movement of the plate 532 towards the plate 512. The notch plate 574 is coupled to a splined rotatable hub (not shown) by internal splines 578 formed on inner axially extending surface 575 of notch plate 574 to rotate relative to and within the plate 512 about an axis of rotation.

A snap ring 580 is disposed within a groove 582 formed in an inner axially extending surface 565 of the plate 512 to retain the notch plate 574 to the plate 512. The ring 580 holds the plates 574 and 512 together to prevent axial movement of the plate 574 (to the left is FIG. 5).

The struts 522 lock the notch plate 574 to the pocket plate 512 in one direction of relative rotational movement about an axis of rotation but allow free-wheeling in the opposite direction about the axis of rotation. As noted earlier, other operating configurations are also possible. The struts 522 lock the notch plate 574 when the coil 554 is "off". The struts 522 unlock the notch plate 574 when the plate 532 and the supported springs 524 move to the right as shown in FIG. 5 during energizing of the armature coil 554. The energized coil 554 generates a magnetic flux or field which may be considered as flowing through the coil housing 548, through a portion 537 of the plate 532 and across small air gaps between the coil housing 548 and the armature plate 532. The magnetic flux density is created to provide an attractive force between the housing 548 and the plate 532 to move the plate 532 to the right as shown in FIG. 5.

Figure 6:
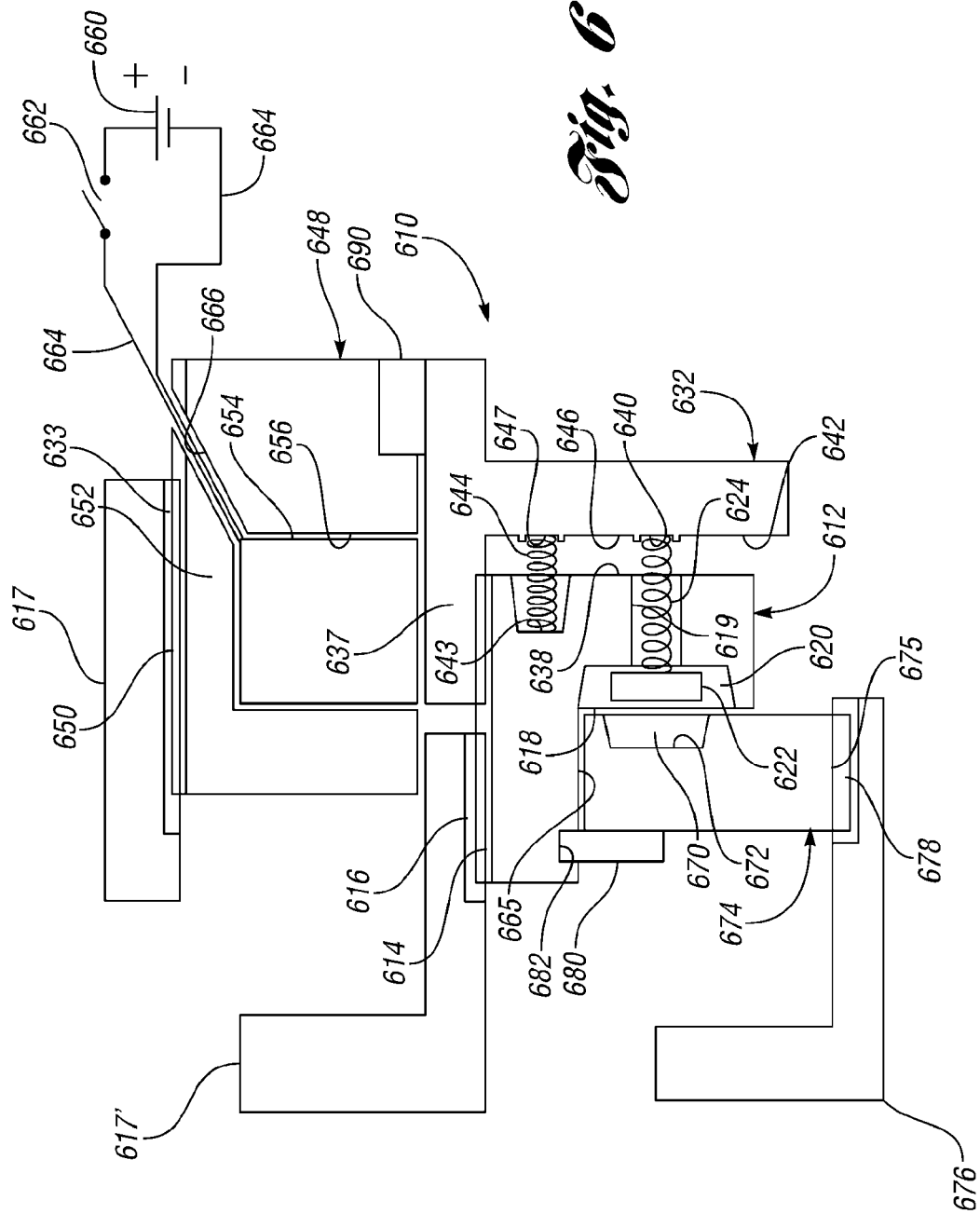

FIG. 6 is a side schematic view, partially broken away and in cross section (but not showing any crosshatching) of the upper half (for purposes of simplicity because of symmetry) of a sixth embodiment of a controllable one-way clutch or coupling assembly, generally indicated at 610, constructed in accordance with the present invention. The assembly 610 includes an annular pocket plate, generally indicated at 612. An outer axially-extending surface 614 of the plate 612 has external splines 616 by which the plate 612 is coupled or splined to a member 617' which may be a transmission case or a rotatable hub. Consequently, the plate 612 can either be stationary or rotatable in this embodiment. The splines 616 also couple the plate 612 to a T-shaped biasing plate, generally indicated 632, which rotates with the plate 612 by means of a bushing 690 which rotatably supports the plate 632.

An inner radially extending surface 618 of the plate 612 is formed with spaced pockets 620 (only one of which is shown), in which struts 622 (only one of which is shown) are received and retained. One end portion of each strut 622 may be biased outwardly by a coil spring (not shown) disposed within an aperture of the pocket 620 so that the strut 622 is normally maintained in its pocket 620. The opposite end portion of each strut 622 is controllably biased by a spring 624 when the annular biasing, armature plate or member 632 on which the springs 624 are supported move towards the opposite end portion of the strut 622. The springs 624 extend through and within holes 619 through the pocket plate 612 to overcome the bias of the coil springs.

A coil housing member, generally indicated at 648, has splines 633 formed on an internal axially extending surface 650 of a portion 652 of the member 648 by which the housing 648 is splined to a transmission case 617. An electromagnetic coil 654 is disposed within a cavity 656 within the housing 648 so that the coil 654 is stationary.

The springs 624 extend through an outer radially extending surface 638 of the plate 612 and into the holes 619. A plurality of spring supports 640 are formed on an inner surface 642 of the plate 632 to support the springs 624. The biasing plate 632 also supports a plurality of biasing coil springs 644 which extend between the outer surface 646 of the plate 632 and apertures 643 formed in the surface 638 of the plate 612.

The coil 654 has many turns and is preferably embedded within and surrounded by a suitable resin. The coil housing 648 is of a paramagnetic material such as steel or malleable iron. The coil 654 attracts a portion 637 of the biasing armature plate 632 to move to the left relative to the housing 648 (as shown in FIG. 6) against the biasing action of the springs 644 when energized by a DC voltage source 660. The source 660 is controlled by a controller in the form of a switch 662. Wiring 664 to the coil 654 extends from the source 660 and the switch 662 through a passage 666 formed through the housing 648.

The struts 622 pivot in their pockets 620 (by the biasing action of the springs 624) to engage spaced locking formations or notches 670 formed in a radially extending surface 672 of a rotatable notch plate, generally indicated at 674. The struts 622 engage the locking formations 670 during movement of the plate 632 towards the plate 612. The notch plate 674 is coupled to a splined rotatable hub 676 by internal splines 678 formed on inner axially extending surface 675 of the notch plate 674 to rotate relative to and within the plate 612 about an axis of rotation.

A snap ring 680 is disposed within a groove 682 formed in an inner axially extending surface 665 of the plate 612 to retain the notch plate 674 to the plate 612. The ring 680 holds the plates 674 and 612 together to prevent axial movement of the plate 674 (to the left is FIG. 6).

The struts 622 lock the notch plate 674 to the pocket plate 612 in one direction of relative rotational movement about an axis of rotation but allow free-wheeling in the opposite direction about the axis of rotation. As noted earlier, other operating configurations are also possible. The struts 622 lock the notch plate 674 when the coil 654 is "on" or energized. The struts 622 unlock the notch plate 674 when the plate 632 and the supported springs 624 move to the right in FIG. 6 by means of the springs 644 when the armature coil 654 is turned "off". The energized coil 654 generates a magnetic flux or field which may be considered as flowing through the coil housing 648, through the portion 637 of the plate 632 and across the small air gaps between the coil housing 648 and the armature plate 632. The magnetic flux density is created to provide an attractive force between the housing 648 and the portion 637 of the plate 632 to move the plate 632 to the left in FIG. 6.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An overrunning coupling and control assembly comprising:

first and second coupling members supported for rotation relative to one another about a common rotational axis, the first coupling member having a coupling first face oriented to face axially in a first direction along the rotational axis and the second coupling member having a coupling second face opposed to the first face and oriented to face axially in a second direction along the rotational axis, the second coupling member having a third face spaced from the second face and oriented to face axially in the first direction; the second face having a set of pockets spaced about the rotational axis, each pocket of the set having a strut received thereby; the first face having a set of locking formations that are engaged by the struts upon projecting outwardly from the set of pockets to prevent relative rotation of the first and second coupling members with respect to each other in at least one direction about the axis; the third face having a set of passages spaced about the rotational axis and in communication with their respective pockets;

a support member; and an electromechanical actuator subassembly including:

an electromagnetically inductive coil to create a magnetic flux when the coil is energized, wherein one of the support member and the second coupling member is an armature member of the subassembly, the armature member being mounted for controlled shifting movement along the rotational axis relative to the first coupling member between a first position which corresponds to a first mode of the assembly and a second position which corresponds to a second mode of the assembly;

a set of actuators supported by the support member, each passage of the set of passages having an actuator received thereby to actuate its respective strut within its respective pocket so that its respective strut moves into contact with the locking formations to couple the first and second coupling members for rotation with each other in at least one direction about the rotational axis in one of the positions of the armature member; and at least one biasing member exerting a biasing force on the armature member along the rotational axis wherein a control force is applied to the armature member when the coil is energized to cause the armature member to move from its first position to its second position along the rotational axis against the biasing force of the at least one biasing member and wherein in the absence of the control force the at least one biasing member moves the armature member from the second position back to the first position along the rotational axis.

2. The assembly as claimed in claim 1, wherein each of the struts has an end that is pivotally movable outwardly of its respective pocket.

3. The assembly as claimed in claim 2, further comprising a set of biasing members that bias their respective struts against pivotal movement of their respective ends out of their respective pockets toward the locking formations wherein the set of actuators pivot the ends of their respective struts against the bias of the set of biasing members and into contact with the locking formations to couple the first and second coupling members for rotation with each other in the at least one direction about the rotational axis and wherein the set of biasing members are configured to move the ends of each respective strut back into their respective pockets to permit relative rotation of the coupling members in the at least one direction about the rotational axis.

4. The coupling assembly as claimed in claim 1, wherein the support member is the armature member and wherein the at least one biasing member is disposed between the second coupling member and the support member to urge the support member towards its first position.

5. The assembly as claimed in claim 1, wherein the first position as an overrun position, the first mode is an overrun mode, the second position is a locked position and the second mode is a locked mode.

6. The assembly as claimed in claim 1, wherein the first position is a locked position, the first mode is a locked mode, the second position is an overrun position and the second mode is an overrun mode.

7. The assembly as claimed in claim 1, wherein the struts include at least one forward strut.

8. The assembly as claimed in claim 1, wherein the set of actuators includes spring actuators.

9. The assembly as claimed in claim 1, wherein the first, second and third faces are generally annular and extend generally radially with respect to the rotational axis.

10. The assembly as claimed in claim 1, wherein the subassembly includes a stationary housing having a cavity in which the coil is housed, the housing having an opening at which the armature member moves along the rotational axis when the control force is applied.

11. The assembly as claimed in claim 10, the armature member moves into the cavity at the opening.

12. The assembly as claimed in claim 10, wherein the armature member moves transverse the opening.

13. The assembly as claimed in claim 10, wherein the support member is the armature member and wherein the subassembly further includes a bearing for rotatably supporting the support member.

14. The assembly as claimed in claim 1, wherein the second coupling member is the armature member and wherein the at least one biasing member is disposed between the second coupling member and the support member to urge the second coupling member towards its first position.

15. The assembly as claimed in claim 1, wherein the support member is the armature member and wherein the at least one biasing member urges the support member towards its first position.

16. An overrunning clutch and control assembly comprising:
first and second clutch members supported for rotation relative to one another about a common rotational axis, the first clutch member having a coupling first face oriented to face axially in a first direction along the rotational axis and the second clutch member having a coupling second face opposed to the first face and oriented to face axially in a second direction along the rotational axis, the second clutch member having a third face spaced from the second face and oriented to face axially in the first direction; the second face having a set of pockets spaced about the rotational axis, each pocket of the set having a strut received thereby; the first face having a set of locking formations that are engaged by the struts upon projecting outwardly from the set of pockets to prevent relative rotation of the first and second clutch members with respect to each other in at least one direction about the axis; the third face having a set of passages spaced about the rotational axis and in communication with their respective pockets;
a support member; and
an electromechanical actuator subassembly including:
an electromagnetically inductive coil to create a magnetic flux when the coil is energized, wherein one of the support member and the second clutch member is an armature member of the subassembly, the armature member being mounted for controlled shifting movement along the rotational axis relative to the first clutch member between a first position which corresponds to a first mode of the assembly and a second position which corresponds to a second mode of the assembly;
a set of actuators supported by the support member, each passage of the set of passages having an actuator received thereby to actuate its respective strut within its respective pocket so that its respective strut moves into contact with the locking formations to couple the first and second clutch members for rotation with each other in at least one direction about the rotational axis in one of the positions of the armature member; and
at least one biasing member exerting a biasing force on the armature member along the rotational axis wherein a control force is applied to the armature member when the coil is energized to cause the armature member to move from its first position to its second position along the rotational axis against the biasing force of the at least one biasing member and wherein in the absence of the control force the at least one biasing member moves the armature member from the second position back to the first position along the rotational axis.

17. The assembly as claimed in claim 16, wherein each of the struts has an end that is pivotally movable outwardly of its respective pocket.

18. The assembly as claimed in claim 17, further comprising a set of biasing members that bias their respective struts against pivotal movement of their respective ends out of their respective pockets toward the locking formations wherein the set of actuators pivot the ends of their respective struts against the bias of the set of biasing members and into contact with the locking formations to couple the first and second clutch members for rotation with each other in the at least one direction about the rotational axis and wherein the set of biasing members are configured to move the ends of each respective strut back into their respective pockets to permit relative rotation of the clutch members in the at least one direction about the rotational axis.

19. The coupling assembly as claimed in claim 16, wherein the support member is the armature member and wherein the at least one biasing member is disposed between the second clutch member and the support member to urge the support member towards its first position.

20. The assembly as claimed in claim 16, wherein the first position as an overrun position, the first mode is an overrun mode, the second position is a locked position and the second mode is a locked mode.

21. The assembly as claimed in claim 16, wherein the first position is a locked position, the first mode is a locked mode, the second position is an overrun position and the second mode is an overrun mode.

22. The assembly as claimed in claim 16, wherein the struts include at least one forward strut.

23. The assembly as claimed in claim 16, wherein the set of actuators includes spring actuators.

24. The assembly as claimed in claim 16, wherein the first, second and third faces are generally annular and extend generally radially with respect to the rotational axis.

25. The assembly as claimed in claim 16, wherein the subassembly includes a stationary housing having a cavity in which the coil is housed, the housing having an opening at which the armature member moves along the rotational axis when the control force is applied.

26. The assembly as claimed in claim 25, the armature member moves into the cavity at the opening.

27. The assembly as claimed in claim 25, wherein the armature member moves transverse the opening.

28. The assembly as claimed in claim 25, wherein the support member is the armature member and wherein the subassembly further includes a bearing for rotatably supporting the support member.

29. The assembly as claimed in claim 16, wherein the second clutch member is the armature member and wherein the at least one biasing member is disposed between the second clutch member and the support member to urge the second clutch member towards its first position.

30. The assembly as claimed in claim 16, wherein the support member is the armature member and wherein the at least one biasing member urges the support member towards its first position.

* * * * *

UNITED STATES PATENT AND TRADEMARK OFFICE
CERTIFICATE OF CORRECTION

PATENT NO.       : 8,720,659 B2                                    Page 1 of 1
APPLICATION NO.  : 13/050377
DATED            : May 13, 2014
INVENTOR(S)      : Brice A. Pawley et al.

It is certified that error appears in the above-identified patent and that said Letters Patent is hereby corrected as shown below:

In the Claims

Column 13, Line 5, Claim 5:

After "wherein the first position"
Delete "as" and insert -- is --.

Signed and Sealed this
Fifth Day of August, 2014

Michelle K. Lee
*Deputy Director of the United States Patent and Trademark Office*